US011783505B2

(12) United States Patent
Suzuki

(10) Patent No.: US 11,783,505 B2
(45) Date of Patent: Oct. 10, 2023

(54) CAMERA POSITION DETECTION APPARATUS, CAMERA UNIT, CAMERA POSITION DETECTION METHOD, AND MEDIUM

(71) Applicant: JVCKENWOOD Corporation, Yokohama (JP)

(72) Inventor: Takumi Suzuki, Yokohama (JP)

(73) Assignee: JVCKENWOOD Corporation, Yokohama-Shi (JP)

( * ) Notice: Subject to any disclaimer, the term of this patent is extended or adjusted under 35 U.S.C. 154(b) by 86 days.

(21) Appl. No.: 17/515,586

(22) Filed: Nov. 1, 2021

(65) Prior Publication Data
US 2022/0051434 A1     Feb. 17, 2022

Related U.S. Application Data

(63) Continuation of application No. PCT/JP2020/020270, filed on May 22, 2020.

(30) Foreign Application Priority Data

May 22, 2019  (JP) ................................. 2019-096015

(51) Int. Cl.
*G06T 7/73*     (2017.01)
*B60R 1/00*     (2022.01)

(52) U.S. Cl.
CPC .................. *G06T 7/73* (2017.01); *B60R 1/00* (2013.01); *B60R 2300/105* (2013.01); (Continued)

(58) Field of Classification Search
CPC ............. G06T 7/73; G06T 2207/30244; G06T 2207/30252; G06T 2207/30268; (Continued)

(56) References Cited

U.S. PATENT DOCUMENTS

2018/0188032 A1*  7/2018  Ramanandan .......... G01S 19/49
2019/0253597 A1*  8/2019  Satou ..................... H04N 23/73
2019/0273869 A1*  9/2019  Ramalingam ........ H04N 23/683

FOREIGN PATENT DOCUMENTS

JP   2011-250193   12/2011
WO  2017/174250   10/2017

OTHER PUBLICATIONS

International Search Report and Written Opinion for International Application No. PCT/JP2020/020270 dated Aug. 18, 2020, 9 pages.

(Continued)

*Primary Examiner* — Farzana Hossain
(74) *Attorney, Agent, or Firm* — AMIN, TUROCY & WATSON, LLP

(57) ABSTRACT

A camera position detection apparatus detects imaging positions of a plurality of cameras that are mounted on a vehicle and that include acceleration sensors, where the imaging positions indicate positions at which the cameras capture images with respect to the vehicle. The camera position detection apparatus includes a reference camera information acquisition unit that acquires information on the imaging position of a reference camera that is a part of the cameras, an acceleration acquisition unit that acquires information on acceleration detected by the acceleration sensor for each of the cameras, and an imaging position detection unit that detects an imaging position of a setting target camera that is the camera different from the reference camera among the cameras.

8 Claims, 9 Drawing Sheets

(52) U.S. Cl.
CPC ............... *B60R 2300/302* (2013.01); *G06T 2207/30244* (2013.01); *G06T 2207/30252* (2013.01); *G06T 2207/30268* (2013.01)

(58) Field of Classification Search
CPC ............ B60R 1/00; B60R 2300/105; B60R 2300/302; B60R 1/20; B60R 2300/402; H04N 7/181; H04N 17/002; H04N 23/6812; H04N 23/90; H04N 23/60; B62D 41/00; G01C 21/10
See application file for complete search history.

(56) References Cited

OTHER PUBLICATIONS

Extended European Search Report for European Patent Application No. 20809832.7 dated Apr. 21, 2022.

\* cited by examiner

CAMERA POSITION DETECTION APPARATUS, CAMERA UNIT, CAMERA POSITION DETECTION METHOD, AND MEDIUM

CROSS-REFERENCE TO RELATED APPLICATION(S)

This application is a Continuation of PCT international application Ser. No. PCT/JP2020/020270 filed on May 22, 2020 which designates the United States, incorporated herein by reference, and which claims the benefit of priority from Japanese Patent Application No. 2019-096015, filed on May 22, 2019, incorporated herein by reference.

BACKGROUND

1. Technical Field

The present disclosure relates to a camera position detection apparatus, a camera unit, a camera position detection method, and a medium.

2. Description of the Related Art

In some cases, a camera is mounted on a vehicle and captures images around the vehicle. Furthermore, as described in Japanese Laid-open Patent Publication No. 2011-250193 A for example, in some cases, to capture images around a vehicle, a plurality of cameras may be mounted on a drive recorder that records captured images of the cameras when a crash or the like occurs.

When a plurality of cameras are mounted, it is necessary to identify a position of each of the cameras, i.e., a position at which each of the cameras captures an image with respect to the vehicle, and input the positions in a control device of the cameras. If the operation as described above is not performed, it may become difficult to identify which of positions with respect to the vehicle appears in the image that is captured by each of the cameras. However, for example, it may be difficult for a certain operator to identify and input imaging positions of the cameras in advance, and it takes time and effort to identify the imaging positions of all of the cameras. Therefore, there is a demand to appropriately and easily detect an imaging position of each of cameras when a plurality of cameras are mounted on a vehicle.

The present embodiments are conceived in view of the foregoing situation, and an object of the embodiments is to provide a camera position detection apparatus, a camera unit, a camera position detection method, and a program capable of appropriately and easily detect an imaging position of each of cameras when a plurality of cameras are mounted on a vehicle.

SUMMARY

A camera position detection apparatus according to an aspect of the present embodiment that detects imaging positions of a plurality of cameras that are mounted on a vehicle and that include acceleration sensors, the imaging positions indicating positions at which the cameras capture images with respect to the vehicle, the camera position detection apparatus comprising: a reference camera information acquisition unit that acquires information on the imaging position of a reference camera that is a part of the cameras; an acceleration acquisition unit that acquires information on acceleration detected by the acceleration sensor for each of the cameras; and an imaging position detection unit that detects an imaging position of a setting target camera that is the camera different from the reference camera among the cameras, on the basis of the information on the imaging position of the reference camera, the information on the acceleration of the reference camera, and the information on the acceleration of the setting target camera.

A camera unit according to an aspect of the present embodiment comprising: the camera position detection apparatus; and the plurality of cameras.

A camera position detection method according to an aspect of the present embodiment for detecting imaging positions of a plurality of cameras that are mounted on a vehicle and that include acceleration sensors, the imaging positions indicating positions at which the cameras capture images with respect to the vehicle, the camera position detection method comprising: a reference imaging position acquisition step of acquiring information on the imaging position of a reference camera that is a part of the cameras; an acceleration acquisition step of acquiring information on acceleration detected by the acceleration sensor for each of the cameras; and an imaging position detection step of detecting an imaging position of a setting target camera that is the camera different from the reference camera among the cameras, on the basis of the information on the imaging position of the reference camera, the information on the acceleration of the reference camera, and the information on the acceleration of the setting target camera.

A non-transitory computer readable recording medium storing therein a program according to an aspect of the present embodiment that causes a computer to detect imaging positions of a plurality of cameras that are mounted on a vehicle and that include acceleration sensors, the imaging positions indicating positions at which the cameras capture images with respect to the vehicle, the program causing the computer to execute: a reference imaging position acquisition step of acquiring information on the imaging position of a reference camera that is a part of the cameras; an acceleration acquisition step of acquiring information on acceleration detected by the acceleration sensor for each of the cameras; and an imaging position detection step of detecting an imaging position of a setting target camera that is the camera different from the reference camera among the cameras, on the basis of the information on the imaging position of the reference camera, the information on the acceleration of the reference camera, and the information on the acceleration of the setting target camera.

According to one embodiment, it is possible to appropriately and easily set imaging positions of cameras.

DETAILED DESCRIPTION OF THE PREFERRED EMBODIMENTS

Examples of the present embodiments will be described in detail below based on the drawings. The present embodiments are not limited by the examples described below.

Figure 1:
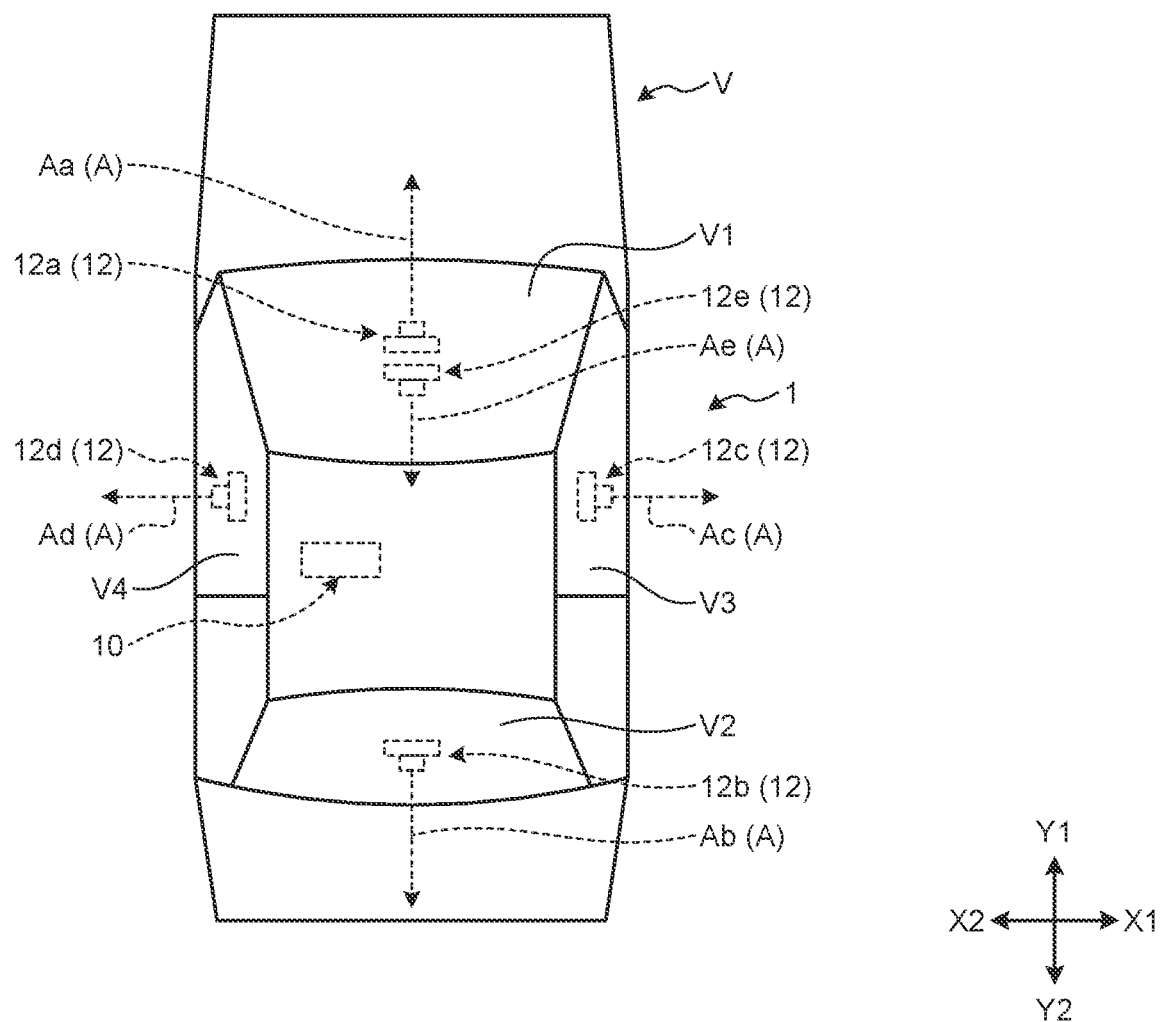
FIG. 1 is a schematic diagram of a camera unit according to the present embodiment.

FIG. 1 is a schematic diagram of a camera unit according to the present embodiment. As illustrated in FIG. 1, a camera unit 1 according to the present embodiment includes a camera position detection apparatus 10 and a plurality of cameras 12, and is mounted on a vehicle V. In the following, a traveling direction of the vehicle V, i.e., a forward direction viewed from the vehicle V is referred to as a direction Y1. Furthermore, an opposite direction of the traveling direction (the direction Y1) of the vehicle V, i.e., a backward direction viewed from the vehicle V is referred to as a direction Y2. Moreover, a direction perpendicular to the direction Y1 and a rightward direction viewed from the vehicle V is referred to as a direction X1. Furthermore, an opposite direction of the direction X1, i.e., a leftward direction viewed from the vehicle V is referred to as a direction X2. In addition, hereinafter, intra-vehicle indicates a space inside the vehicle, i.e., a space in which seats of the vehicle V are arranged. Moreover, extra-vehicle indicates a space outside the vehicle V.

The camera position detection apparatus 10 is an apparatus that is arranged inside the vehicle V and detects imaging positions of the cameras 12. The cameras 12 are mounted on the vehicle V and capture images of inside and outside of the vehicle V. In the present embodiment, cameras 12a, 12b, 12c, 12d, and 12e are arranged as the cameras 12. However, the number of the cameras 12 is not limited to five, and may be set arbitrarily as long as the number is plural.

In the present embodiment, the camera 12a is mounted on the direction Y1 side of the vehicle V. The camera 12a is mounted on the vehicle V such that an imaging direction Aa goes along the direction Y1. The imaging direction indicates a direction in which each of the cameras 12 captures an image, and is also referred to as a direction in which a lens is oriented. Therefore, the camera 12a captures an image on the direction Y1 side of the vehicle V. More specifically, the camera 12a captures an image of the outside of the vehicle on the direction Y1 side of the the vehicle V. In the example in FIG. 1, the camera 12a is arranged on an inner side of a front window V1 of the vehicle V, i.e., a surface of the front window V1 on an inner side of the vehicle, and the lens is oriented in the direction Y1. However, the camera 12a need not always be arranged on the front window V1.

The camera 12b is mounted on the direction Y2 side of the vehicle V. The camera 12b is mounted on the vehicle V such that an imaging direction Ab goes along the direction Y2. Therefore, the camera 12b captures an image on the direction Y2 side of the vehicle V. More specifically, the camera 12b captures an image of the outside of the vehicle on the direction Y2 side of the vehicle V. In the example in FIG. 1, the camera 12b is arranged on an inner side of a rear glass V2 of the vehicle V, i.e., a surface of the rear glass V2 on the inner side of the vehicle, and a lens is oriented in the direction Y2. However, the camera 12b need not always be arranged on the rear glass V2.

The camera 12c is mounted on the direction X1 side of the vehicle V. The camera 12c is mounted on the vehicle V such that an imaging direction Ac goes along the direction X1. Therefore, the camera 12c captures an image on the direction X1 side of the vehicle V. More specifically, the camera 12c captures an image of the outside of the vehicle on the direction X1 side of the vehicle V. In the example in FIG. 1, the camera 12c is arranged on an inner side of a side glass V3 of the vehicle V, i.e., a surface of the side glass V3 on the inner side of the vehicle, and a lens is oriented in the direction X1. However, the camera 12c need not always be arranged on the side glass V3.

The camera 12d is mounted on the direction X2 side of the vehicle V. The camera 12d is mounted on the vehicle V such that an imaging direction Ad goes along the direction X2. Therefore, the camera 12d captures an image on the direction X2 side of the vehicle V. More specifically, the camera 12d captures an image of the outside of the vehicle on the direction X2 side of the vehicle V. In the example in FIG. 1, the camera 12d is arranged on an inner side of a side glass V4 of the vehicle V, i.e., a surface of the side glass V4 on the inner side of the vehicle, and a lens is oriented in the direction X2. However, the camera 12d need not always be arranged on the side glass V4.

The camera 12e is mounted on the direction Y1 side of the vehicle V. The camera 12e is mounted on the vehicle V such that an imaging direction Ae goes along the direction Y2. Therefore, the camera 12e captures an image of the inside of the vehicle V from the Y1 side to the Y2 side of the vehicle V. In the example in FIG. 1, the camera 12e is arranged on the inner side of the front window V1 of the vehicle V, i.e., the surface of the front window V1 on the inner side of the vehicle, and a lens is oriented in the direction Y2. However, the camera 12e need not always be arranged on the front window V1.

In this manner, imaging directions A of the cameras 12a, 12b, 12c, and 12d are different from one another. Furthermore, the imaging directions A of the camera 12b and the camera 12e are the same direction Y2, but imaging targets, i.e., the inside and the outside of the vehicle, are different from each other. In other words, the plurality of cameras 12 are mounted on the vehicle V such that at least one of the imaging directions A and whether an image of the inside of the vehicle or an image of the outside of the vehicle is captured, is differentiated. The imaging directions A and intra-vehicle/extra-vehicle information that indicates whether an image of the inside of the vehicle or an image of the outside of the vehicle is captured are information indicating a position at which each of images is captured with respect to the vehicle V; therefore, hereinafter, the information may be appropriately referred to as an imaging position. In other words, the imaging position indicates at least one of the imaging direction A and the intra-vehicle/extra-vehicle information.

Here, when images captured by the cameras 12 are displayed or transmitted, it is necessary to identify the imaging position of each of the cameras 12, i.e., a direction (imaging direction) in which the image is captured with respect to the vehicle V, and identify whether an image of the inside or an image of the outside of the vehicle V is captured. If the imaging position is not identified, it is difficult to identify where an image is captured by each of the cameras 12, so that it may be difficult to appropriately display the captured images or it may be difficult to appropriately transmit a requested image to the outside. For example, even if an image of the outside of the vehicle on the direction Y1 side is captured, the image may be displayed as an image of the inside of the vehicle on the direction Y2 side. Furthermore, for example, a user may identify the imaging position of each of the cameras 12 and input the imaging position of each of the cameras 12 to an apparatus that manages images. In this case, it is necessary to identify and input the imaging position of each of the cameras 12, and it takes time and effort. In contrast, the camera position detection apparatus 10 according to the present embodiment performs a calibration process to be described later to identify the imaging position of each of the cameras 12 and set the imaging positions.

Figure 2:
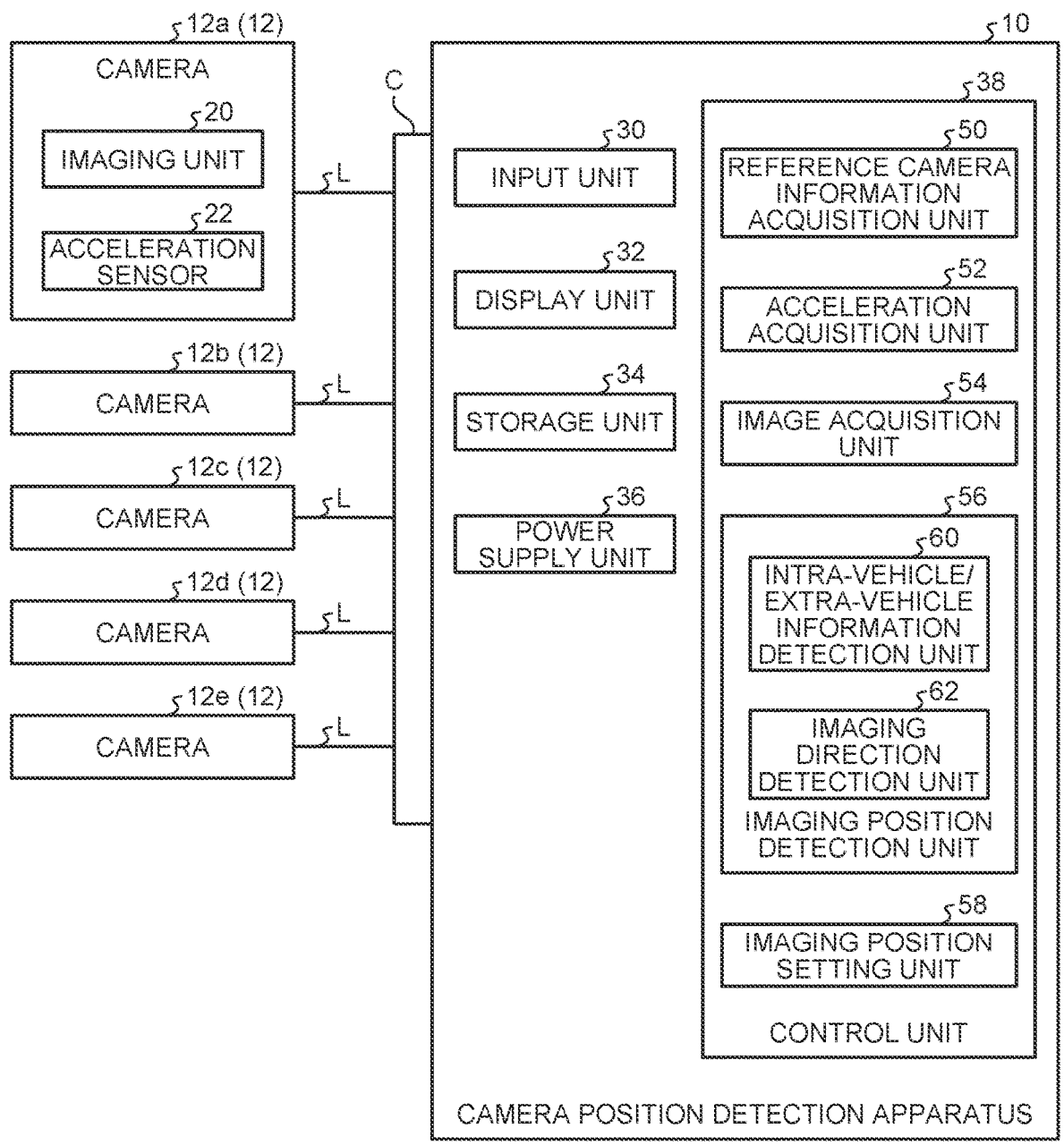
FIG. 2 is a schematic block diagram of the camera unit according to the present embodiment.

FIG. 2 is a schematic block diagram of the camera unit according to the present embodiment. As illustrated in FIG. 2, each of the cameras 12 includes an imaging unit 20 and an acceleration sensor 22. The imaging unit 20 is an imaging device that includes a lens and an imaging element, and captures an image in the imaging direction A. In the present embodiment, the imaging unit 20 captures an image at a predetermined frame rate, and therefore, may be regarded as capturing a moving image. The acceleration sensor 22 is a sensor that detects acceleration of the camera 12. The acceleration sensor 22 detects, as the acceleration, a magnitude of the acceleration that acts on the camera 12 and an acceleration direction that acts on the camera 12. The acceleration direction is a direction of the acceleration that acts on the camera 12. The camera 12 is fixed to a certain position on the vehicle V, and therefore integrally moves with the vehicle V when the vehicle V travels. The acceleration sensor 22 is regarded as detecting acceleration of the camera 12 and acceleration of the vehicle V. Meanwhile, in the example in FIG. 2, it is indicated that the camera 12a includes the imaging unit 20 and the acceleration sensor 22 for the sake of convenience; however, in reality, each of the cameras 12 includes the imaging unit 20 and the acceleration sensor 22.

Figure 3:
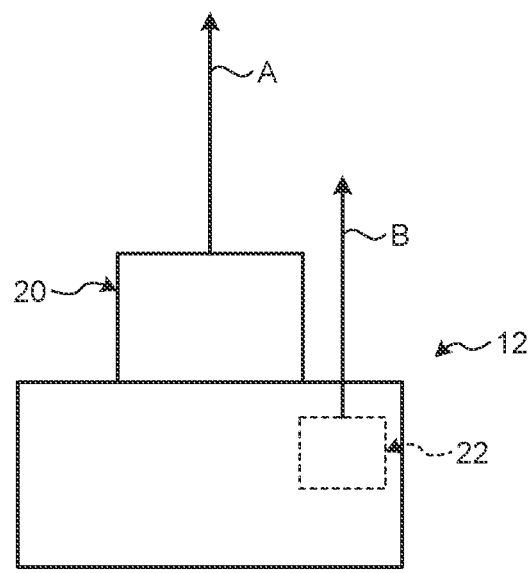
FIG. 3 is a schematic diagram for explaining an imaging direction and an acceleration reference direction of a camera.

FIG. 3 is a schematic diagram for explaining the imaging direction and an acceleration reference direction of the camera. An acceleration reference direction B illustrated in FIG. 3 is a direction as a reference for the acceleration direction. More specifically, the acceleration reference direction B is a direction as a reference for the direction of the acceleration that acts on the camera 12, where the direction of the acceleration is detected by the acceleration sensor 22. In other words, the acceleration sensor 22 detects, as the acceleration direction, an orientation of the direction of the acceleration that acts on the camera 12 with respect to the acceleration reference direction B. The acceleration reference direction B is a direction that is fixed with respect to the acceleration sensor 22, and therefore, the direction is also fixed with respect to the camera 12. Furthermore, in the camera 12, the position of the acceleration sensor 22 with respect to the imaging unit 20 is fixed. Therefore, the orientation of the acceleration reference direction B is fixed with respect to the imaging direction A (a direction in which the imaging unit 20 is oriented). In the present embodiment, the acceleration reference direction B is set to the same direction as the imaging direction A. However, the acceleration reference direction B may be set so as to be inclined with respect to the imaging direction A.

Referring back to FIG. 2, the camera position detection apparatus 10 is an apparatus that acquires images captured by the cameras 12. In the present embodiment, the camera position detection apparatus 10 is a drive recorder that records the images captured by the cameras 12, but is not limited to the drive recorder. The camera position detection apparatus 10 includes a connector unit C, an input unit 30, a display unit 32, a storage unit 34, a power supply unit 36, and a control unit 38. The connector unit C is a connection terminal that is connected to the cameras 12. Each of the cameras 12 is connected to a line L, and is connected to the camera position detection apparatus 10 by connecting the line L to the connector unit C. In other words, the camera position detection apparatus 10 transmits and receives information to and from the cameras 12 via the connector unit C and the lines L. However, the camera position detection apparatus 10 need not always transmit and receive information to and from the cameras 12 by wires as described above, but may be transmit and receive information by radio, for example.

The input unit 30 is an input device that receives operation of a user. The input unit 30 may be a plurality of buttons, a touch panel, or the like. The display unit 32 is a display device that displays captured images of the cameras 12, or the like. The storage unit 34 is a memory for storing calculation contents of the control unit 38, information on a program, or the like, and includes at least one of a random access memory (RAM), a read only memory (ROM), and an external storage device, such as a hard disk drive (HDD). The power supply unit 36 is a power supply for supplying electric power to each of the units of the camera position detection apparatus 10.

The control unit 38 is an arithmetic device, i.e., a central processing unit (CPU). The control unit 38 includes a reference camera information acquisition unit 50, an acceleration acquisition unit 52, an image acquisition unit 54, an imaging position detection unit 56, and an imaging position setting unit 58. The reference camera information acquisition unit 50, the acceleration acquisition unit 52, the image acquisition unit 54, the imaging position detection unit 56, and the imaging position setting unit 58 are implemented by causing the control unit 38 to read software (program) stored in the storage unit 34, and execute a process to be described later.

The control unit 38 identifies and sets the imaging position of each of the cameras 12 in a certain process, i.e., a calibration process, to be described later. In other words, while the cameras 12 are mounted on the vehicle V as illustrated in FIG. 1 for example, the camera position detection apparatus 10 does not yet identify the imaging positions of the cameras 12, i.e., does not yet recognize mounting positions of the cameras 12 on the vehicle V, at the time of performing the calibration process. In other words, for example, the camera 12b is mounted on the vehicle V so as to capture an image of the outside of the vehicle on the direction Y2 side of the vehicle V, but the imaging position of the camera 12b (i.e., the imaging direction goes along the direction Y2 and the image of the outside of the vehicle is to be captured) is not set in the camera position detection apparatus 10. The camera position detection apparatus 10 identifies the imaging positions of all of the cameras 12 by performing the process to be described later.

The reference camera information acquisition unit 50 acquires information on an imaging position of a reference camera. The information on the imaging position of the reference camera is information that is input to the camera position detection apparatus 10, and the reference camera information acquisition unit 50 acquires the input information on the imaging position on the reference camera. The reference camera is a part of the plurality of cameras 12, and in this example, the single camera. In the present embodiment, information indicating which of the cameras 12 serves as a reference imaging position is input to the camera position detection apparatus 10. The reference camera information acquisition unit 50 sets, as the reference camera, the camera 12 that serves as the reference imaging position, and sets the reference imaging position as the imaging position of the reference camera. In other words, the reference camera information acquisition unit 50 extracts, as the reference camera, the camera 12 that serves as the reference imaging position from among the plurality of cameras 12 on the basis of the input information. Meanwhile, the reference imaging position may be an arbitrary imaging position, but in the present embodiment, corresponds to the position at which the imaging direction is the direction Y1 and an image of the outside of the vehicles is to be captured. Therefore, in this case, information indicating the camera for which the imaging direction is the direction Y1 and which captures an image of the outside of the vehicle is input to the camera position detection apparatus 10. In the example of the present embodiment, information indicating that the camera 12a serves as the reference imaging position is input to the camera position detection apparatus 10. The reference camera information acquisition unit 50 adopts the camera 12a as the reference camera and sets the imaging position of the camera 12a as the positon at which the imaging direction is the direction Y1 and an image of the outside of the vehicles is to be captured.

In this manner, the reference camera information acquisition unit 50 acquires the information indicating the camera 12 that serves as the reference imaging position, but may acquire information indicating the imaging position of the arbitrary camera 12. Specifically, it is sufficient for the reference camera information acquisition unit 50 to acquire a part of the cameras 12 and the imaging position of the camera 12 in an associated manner. In other words, the reference camera information acquisition unit 50 acquires information on the imaging position of the reference camera, and acquires the imaging direction A of the reference camera and the intra-vehicle/extra-vehicle information on the reference camera (information indicating which of an image of the inside of the vehicle and an image of the outside of the vehicle is captured).

Figure 4:
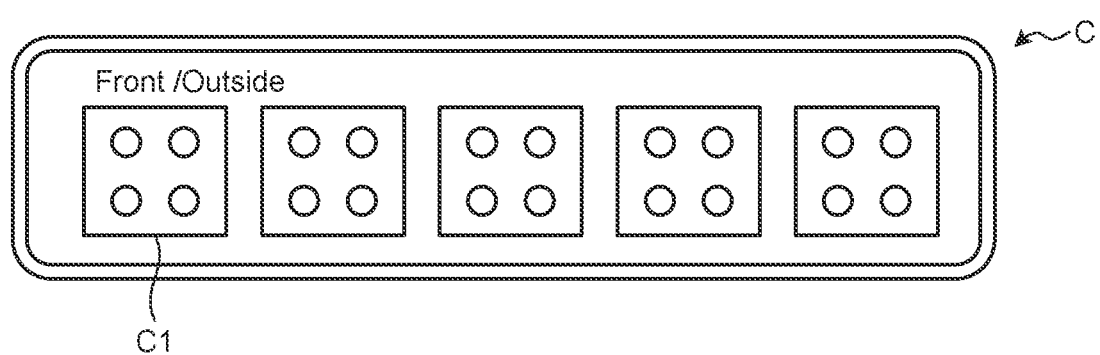
FIG. 4 is a diagram illustrating an example of a method of inputting information on an imaging position of a reference camera.
Figure 5:
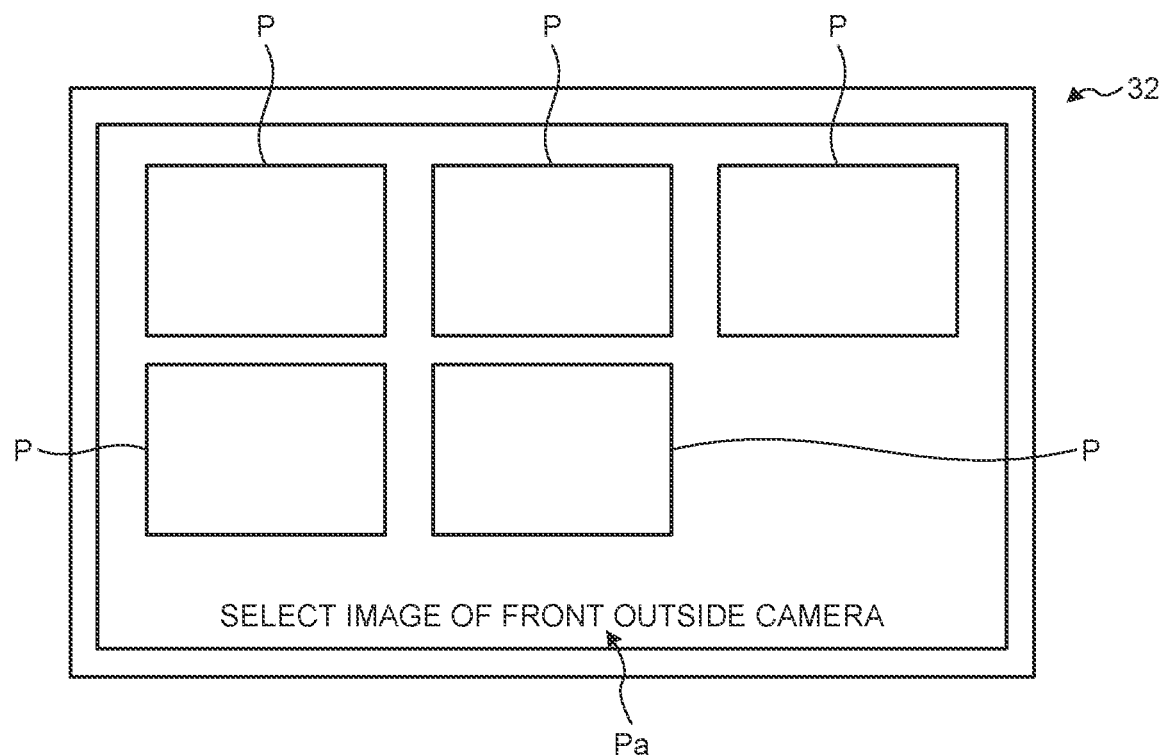
FIG. 5 is a diagram illustrating an example of the method of inputting information on the imaging position of the reference camera.

FIG. 4 and FIG. 5 are diagrams illustrating an example of a method of inputting the information on the imaging position of the reference camera. As illustrated in FIG. 4, the information on the imaging position of the reference camera may be input by, for example, connecting the camera 12 to the connection portion Cl of the connector unit C. The reference camera information acquisition unit 50 is enabled to communicate with the camera 12 by connecting the camera 12 to the connection portion Cl, and therefore recognizes that the camera 12 is connected to the connection portion Cl. The connection portion Cl is set so as to connect the camera 12 at the reference imaging position (in this example, at which an image of the outside of the vehicle is to be captured on the direction Y1 side). Therefore, the reference camera information acquisition unit 50 sets the camera 12 connected to the connection portion Cl as the camera (reference camera) at the reference imaging position. Furthermore, as illustrated in FIG. 5, the image acquisition unit 54 may acquire the captured image of each of the cameras 12 and causes the display unit 32 to display the captured images. In FIG. 5, captured images P of all of the cameras 12 are displayed. In this case, for example, display Pa is provided for requesting a user to select the captured image P of the reference camera (a front outside camera in the example in FIG. 5) at the reference imaging position. Then, when the user selects the captured image P by input operation on the input unit 30, the reference camera information acquisition unit 50 sets the camera 12 that has captured the captured image P selected by the user as the reference camera at the reference imaging position. However, the method of inputting the information on the imaging position of the reference camera is not limited to the above-described example, but may be arbitrary.

Hereinafter, each of the cameras 12 other than the reference camera among the cameras 12 will be appropriately referred to as a setting target camera. In other words, the reference camera is the camera 12 for which the imaging position is input, and the setting target camera is a camera for which the imaging position is not input and the imaging position is to be identified by the camera position detection apparatus 10. Meanwhile, it is preferable that the reference camera for which the imaging position is input is one.

Referring back to FIG. 2, the acceleration acquisition unit 52 acquires information on the acceleration of the vehicle V detected by the acceleration sensor 22, for each of the cameras 12. Specifically, the acceleration acquisition unit 52 acquires acceleration that is detected by the acceleration sensor 22 of the reference camera and acceleration that is detected by the acceleration sensor 22 of the setting target camera. When the calibration process is performed, a user causes the vehicle V to travel after acquisition of the imaging position of the reference camera is completed, for example. The acceleration sensor 22 detects acceleration at the time the vehicle V travels. The acceleration acquisition unit 52 acquires information on the acceleration at the time the vehicle V travels, from the acceleration sensor 22 of each of the cameras 12. As described above, the acceleration acquisition unit 52 acquires, as the information on the acceleration, the information on the acceleration direction from the acceleration sensor 22 of each of the cameras 12.

The image acquisition unit 54 acquires an image that is captured by each of the cameras 12. The captured images of the cameras 12 acquired by the image acquisition unit 54 are used to, for example, input the information on the imaging position of the reference camera as illustrated in FIG. 5 or to detect intra-vehicle/extra-vehicle information on the setting target camera to be described later. It is preferable that the captured image used to detect the intra-vehicle/extra-vehicle information on the setting target camera is an image that is captured when the acceleration sensor 22 detects the acceleration direction, i.e., the image that is captured when the vehicle V travels after acquisition of the imaging position of the reference camera is completed.

The imaging position detection unit 56 detects the imaging position of the setting target camera on the basis of the information on the imaging position of the reference camera, the information on the acceleration of the reference camera, and the information on the acceleration of the setting target camera. The imaging position detection unit 56 includes an intra-vehicle/extra-vehicle information detection unit 60 and an imaging direction detection unit 62.

The intra-vehicle/extra-vehicle information detection unit 60 detects the intra-vehicle/extra-vehicle information as the imaging position of the setting target camera. In the present embodiment, the intra-vehicle/extra-vehicle information detection unit 60 detects the intra-vehicle/extra-vehicle information on the setting target camera on the basis of the captured images of the cameras 12 acquired by the image acquisition unit 54. The intra-vehicle/extra-vehicle information detection unit 60 analyzes the captured images of the cameras 12, and calculates brightness of each of the captured images. The brightness of the captured image indicates luminance of the captured image, and is an average value of luminance of an entire region of the captured image, for example. The intra-vehicle/extra-vehicle information detection unit 60 detects the intra-vehicle/extra-vehicle information on the setting target camera on the basis of the brightness of the captured image of the reference camera and the brightness of the captured image of the setting target camera. The intra-vehicle/extra-vehicle information detection unit 60 compares the brightness of the captured image of the setting target camera with reference brightness, and if the brightness of the captured image of the setting target camera is equal to or larger than the reference brightness (reference luminance), the intra-vehicle/extra-vehicle information detection unit 60 determines that the setting target camera is capturing an image of the outside of the vehicle. In contrast, if, the brightness of the captured image of the setting target camera is smaller than the reference brightness, the intra-vehicle/extra-vehicle information detection unit 60 determines that the setting target camera is capturing an image of the inside of the vehicle. The reference brightness is a value that is based on the brightness of the captured image of the reference camera. The reference brightness is calculated by the intra-vehicle/extra-vehicle information detection unit 60 on the basis of the brightness of the captured image of the reference camera. The intra-vehicle/extra-vehicle information detection unit 60 calculates, as the reference brightness, a value that is obtained by adding a predetermined value to the brightness of the captured image of the reference camera. However, the reference brightness need not always be calculated as described above, but may be set arbitrarily.

In general, the outside of the vehicle is brighter than the inside of the vehicle, so that a captured image of the outside of the vehicle tends to be brighter than a captured image of the inside of the vehicle. The intra-vehicle/extra-vehicle information detection unit 60 determines that the setting target camera is capturing an image of the outside of the vehicle if the brightness of the captured image of the setting target camera is equal to or larger than the reference brightness, so that it is possible to appropriately detect the intra-vehicle/extra-vehicle information, that is, whether an image of the inside of the vehicle is captured or an image of the outside of the vehicle is captured.

However, the method of detecting the intra-vehicle/extra-vehicle information by the intra-vehicle/extra-vehicle information detection unit 60 is not limited to the method as described above. Another example of the method of detecting the intra-vehicle/extra-vehicle information will be described below.

As another example of the method of detecting the intra-vehicle/extra-vehicle information, the intra-vehicle/extra-vehicle information detection unit 60 may determine whether a time period in which the calibration process is being performed, i.e., a time period in which the acceleration is detected and an image is captured, is during daylight hours or during hours after dark on the basis of the brightness of the captured image of the reference camera. In the example of the present embodiment, the reference camera captures an image of the outside of the vehicle, so that the intra-vehicle/extra-vehicle information detection unit 60 is able to determine whether the time period is during daylight hours or during hours after dark on the basis of the brightness of the captured image of the reference camera. For example, the intra-vehicle/extra-vehicle information detection unit 60 determines that the time period is during daylight hours if the brightness of the captured image of the reference camera is equal to or larger than predetermined threshold brightness (threshold luminance), and determines that the time period is during hours after dark if the brightness is smaller than the threshold brightness. Then, when it is determined that the time period is during daylight hours, the intra-vehicle/extra-vehicle information detection unit 60 determines that an image of the outside of the vehicle is captured if the brightness of the captured image of the setting target camera is equal to or larger than the reference brightness, and determines that an image of the inside of the vehicle is captured if the brightness of the captured image of the setting target camera is smaller than the reference brightness. In contrast, when it is determined that the time period is during hours after dark, the intra-vehicle/extra-vehicle information detection unit 60 determines that an image of the inside of the vehicle is captured if the brightness of the captured image of the setting target camera is equal to or larger than the reference brightness, and determines that an image of the outside of the vehicle is captured if the brightness of the captured image of the setting target camera is smaller than the reference brightness. It is likely that the inside of the vehicle is darker during daylight hours and the inside of the vehicle is brighter during hours after dark; therefore, by changing the determination method depending on the time periods as described above, it is possible to appropriately detect the intra-vehicle/extra-vehicle information.

Furthermore, as another example of the method of detecting the intra-vehicle/extra-vehicle information, the intra-vehicle/extra-vehicle information detection unit 60 may detect whether an optical image reflected by a glass of the vehicle appears in the captured image of the setting target camera, and detect the intra-vehicle/extra-vehicle information on the setting target camera on the basis of a detection result. In the present embodiment, the cameras 12 are arranged inside the vehicle V, so that when the cameras 12 capture images of the outside of the vehicle, the images of the outside of the vehicle are captured via glasses (a front window V1 and the like) of the vehicle V. In this case, light reflected by the glasses of the vehicle V enter the cameras 12, and the cameras 12 may capture optical images reflected by the glasses of the vehicle V. Therefore, the intra-vehicle/extra-vehicle information detection unit 60 analyzes the captured image of the setting target camera to determine whether the optical image reflected by the glass of the vehicle V is captured, determines that the setting target camera is capturing an image of the outside of the vehicle if the optical image reflected by the glass of the vehicle V appears, and determines that the setting target camera is capturing an image of the inside of the vehicle if the optical image reflected by the glass of the vehicle V does not appear. The optical image reflected by the glass of the vehicle V may be an arbitrary image, but, for example, may be an image of the camera 12 that is capturing an image.

The intra-vehicle/extra-vehicle information detection unit 60 detects the intra-vehicle/extra-vehicle information on all of the setting target cameras by the method as described above. In the example of the present embodiment, the intra-vehicle/extra-vehicle information detection unit 60 detects that pieces of the intra-vehicle/extra-vehicle information on the cameras 12b, 12c, 12d, and 12e that are the setting target cameras indicate the outside of the vehicle, the outside of the vehicle, the outside of the vehicle, and the inside of the vehicle, respectively.

Figure 6:
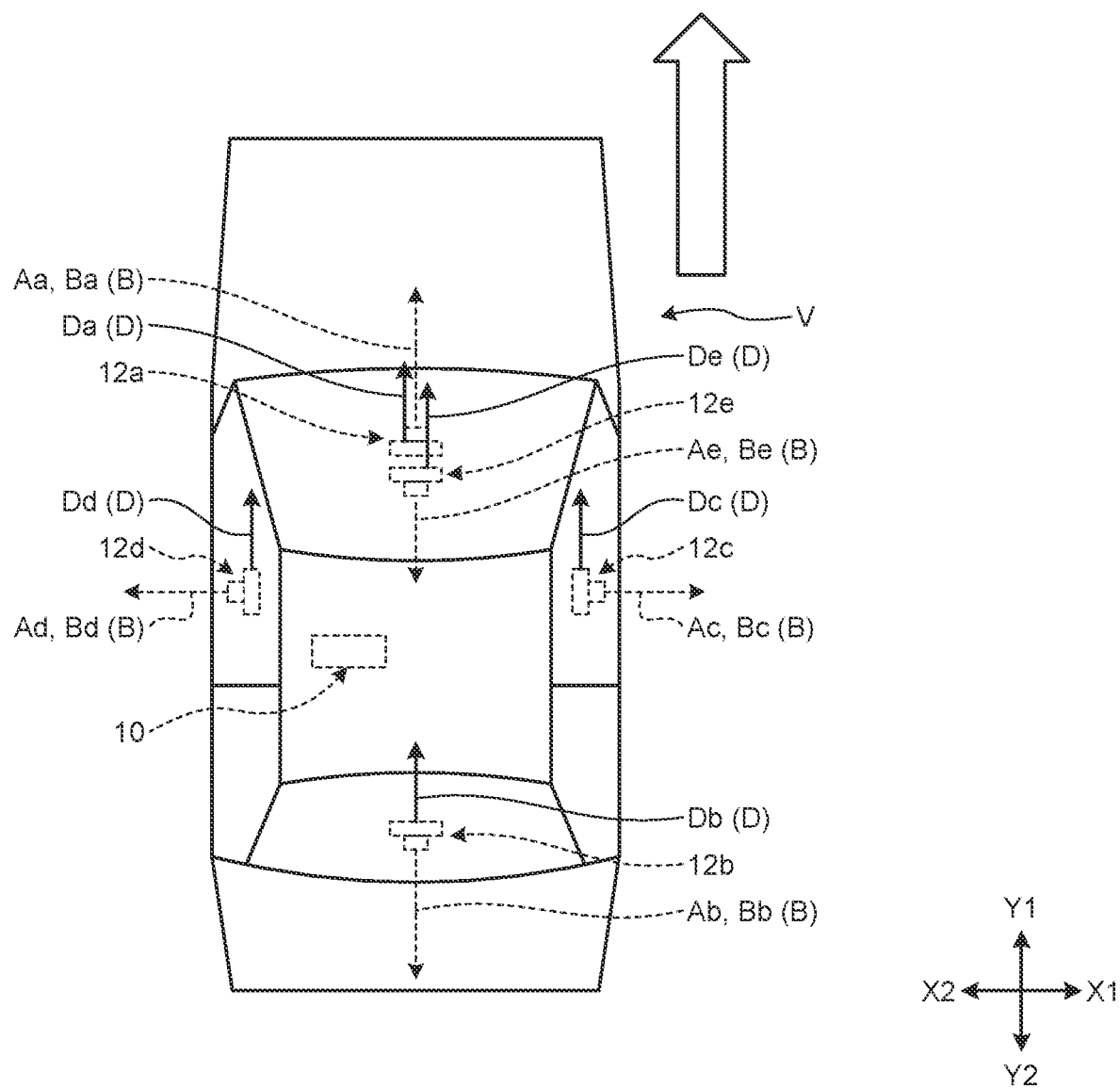
FIG. 6 is a schematic diagram for explaining detection of imaging directions.
Figure 7:
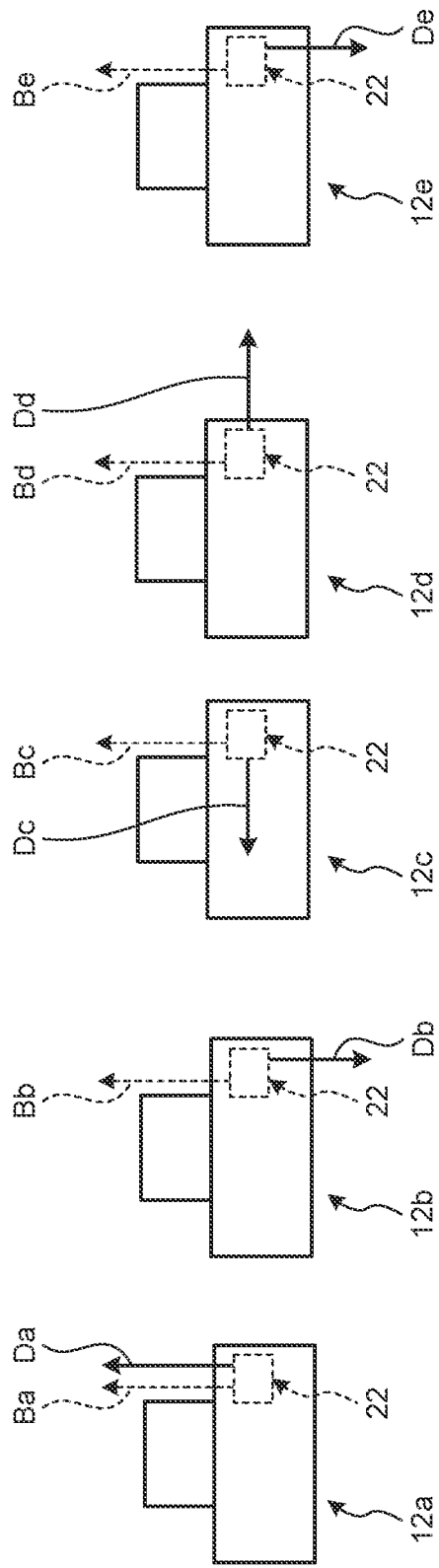
FIG. 7 is a schematic diagram for explaining detection of the imaging directions.

The imaging direction detection unit 62 detects the imaging direction A as the imaging position of the setting target camera on the basis of the information on the acceleration direction acquired by the acceleration acquisition unit 52. FIG. 6 and FIG. 7 are schematic diagrams for explaining detection of the imaging direction. When the vehicle V travels, the acceleration sensor 22 of each of the cameras 12 detects a direction in which the vehicle V travels as the acceleration direction. In other words, as illustrated in the example in FIG. 6, when the vehicle V travels in the direction Y1, an acceleration direction Da detected by the camera 12a, an acceleration direction Db detected by the camera 12b, an acceleration direction Dc detected by the camera 12c, an acceleration direction Dd detected by the camera 12d, and an acceleration direction De detected by the camera 12e are directions that go along the direction Y1 in which the vehicle V travels when viewed from the vehicle V. In the following, when the acceleration directions of the respective cameras 12 are not distinguished from one another, they will be referred to as acceleration directions D.

In contrast, the acceleration reference direction B of the camera 12 illustrated in FIG. 3 is a direction that is fixed to a mounting position of the acceleration sensor 22, i.e., that is fixed to an orientation of the imaging direction A of the camera 12. The imaging direction A of the camera 12 varies for each of the cameras 12, so that the acceleration reference direction B varies for each of the cameras 12. In the example in FIG. 6, an acceleration reference direction Ba of the camera 12a goes along the direction Y1, an acceleration reference direction Bb of the camera 12b goes along the direction Y2, an acceleration reference direction Bc of the camera 12c goes along the direction X1, an acceleration reference direction Bd of the camera 12d goes along the direction X2, and an acceleration reference direction Be of the camera 12e goes along the direction Y2. However, the camera position detection apparatus 10 does not know the positions of the setting target cameras, and therefore does not recognize orientations of the acceleration reference directions B.

Here, the acceleration sensor 22 detects acceleration directions D as relative directions with respect to the acceleration reference directions B. In this case, the acceleration directions D are the same for all of the cameras 12 and go along the direction Y1 when viewed from the vehicle V, but are different for each of the cameras 12 when viewed as the relative directions with respect to the acceleration reference directions B. The imaging direction detection unit 62 acquires the orientation of the acceleration direction D with respect to the setting target camera, by viewing the acceleration direction D as the relative direction with respect to the acceleration reference direction B. For example, as illustrated in FIG. 7, the acceleration direction Da of the camera 12a is a forward direction with respect to the acceleration reference direction Ba, that is, the acceleration direction Da is the same direction as the acceleration reference direction Ba. Furthermore, the acceleration direction Db of the camera 12b is a backward direction with respect to the acceleration reference direction Bb, that is, the acceleration direction Db is the opposite direction of the acceleration reference direction Bb. Moreover, the acceleration direction Dc of the camera 12c is a leftward direction with respect to the acceleration reference direction Bc. Furthermore, the acceleration direction Dd of the camera 12d is a rightward direction with respect to the acceleration reference direction Bd. Moreover, the acceleration direction Dd of the camera 12e on the backward side with respect to the acceleration reference direction Be.

The imaging direction detection unit 62 detects a relative orientation of the setting target camera on the basis of the acceleration direction D of the reference camera and the acceleration direction D of the setting target camera. The relative orientation of the setting target camera is an orientation of the acceleration direction D of the setting target camera viewed from the acceleration reference direction B, with respect to the acceleration direction D of the reference camera viewed from the acceleration reference direction B. For example, as illustrated in FIG. 7, the acceleration direction Da of the camera 12a is a forward direction when viewed from the acceleration reference direction Ba, and the acceleration direction Db of the camera 12b is a backward direction when viewed from the acceleration reference direction Bb. Therefore, the relative orientation of the camera 12b is the backward direction with respect to the camera 12a. Furthermore, the acceleration direction Dc of the camera 12c is a leftward direction when viewed from the acceleration reference direction Bc, so that the relative orientation of the camera 12c is the leftward direction with respect to the camera 12a. Moreover, the relative orientation of the camera 12d is a rightward direction with respect to the camera 12a, and the relative orientation of the camera 12e is the backward direction with respect to the camera 12a. Meanwhile, in the present embodiment, the relative orientations of the setting target cameras match the orientations of the acceleration directions D when the acceleration directions D are viewed as the relative directions with respect to the acceleration reference directions B.

The imaging direction detection unit 62 detects the imaging direction A of the setting target camera on the basis of the relative orientation of the setting target camera detected as described above and the imaging direction A of the reference camera. If the relative orientation of the setting target camera is a front-back direction, that is, if the acceleration directions of the reference camera and the setting target camera are parallel to each other, the imaging direction detection unit 62 adopts, as the imaging direction A of the setting target camera, a direction toward the relative orientation side with respect to the imaging direction A of the reference camera. For example, the relative orientations of the cameras 12b and 12e are backward directions. Therefore, as illustrated in FIG. 6, the imaging direction detection unit 62 adopts the direction Y2, which is the backward direction (relative orientation) with respect to the direction Y1 (the imaging direction Aa of the camera 12a), as the imaging directions Ab and Ae of the cameras 12b and 12e. Furthermore, if the relative orientation of the camera 12 is not the front-back direction, that is, if the acceleration directions of the reference camera and the setting target camera are not parallel to each other (for example, perpendicular to each other), the imaging direction detection unit 62 adopts, as the imaging direction A of the setting target camera, a direction toward an opposite side of the relative orientation with respect to the imaging direction A of the reference camera. For example, the relative orientation of the camera 12c is the leftward direction. Therefore, the imaging direction detection unit 62 adopts the direction X1, which is the rightward direction (the opposite direction of the relative orientation) with respect to the direction Y1 (the imaging direction Aa of the camera 12a), as the imaging direction Ac of the camera 12c. Moreover, the imaging direction detection unit 62 adopts the direction X2, which is the leftward direction (the opposite direction of the relative orientation) with respect to the direction Y1 (the imaging direction Aa of the camera 12a), as the imaging direction Ad of the camera 12d.

The imaging direction detection unit 62 detects the imaging directions A of all of the setting target cameras by the method as described above. Referring back to FIG. 2, the imaging position setting unit 58 sets the imaging positions that are detected for the setting target cameras by the imaging position detection unit 56 as the imaging positions of the respective setting target cameras, and stores the imaging positions in the storage unit 34. Specifically, the imaging position setting unit 58 sets the pieces of intra-vehicle/extra-vehicle information that are detected for the setting target cameras by the intra-vehicle/extra-vehicle information detection unit 60 as the pieces of intra-vehicle/extra-vehicle information on the respective setting target cameras, and stores the pieces of information in the storage unit 34. Furthermore, the imaging position setting unit 58 sets the imaging directions A that are detected for the setting target cameras by the imaging direction detection unit 62 as the imaging directions A of the respective setting target cameras, and stores the imaging directions in the storage unit 34. Meanwhile, the imaging position of the reference camera is already acquired by the reference camera information acquisition unit 50, and therefore, details that are acquired by the reference camera information acquisition unit 50 are already set and stored in the storage unit 34.

Figure 8:
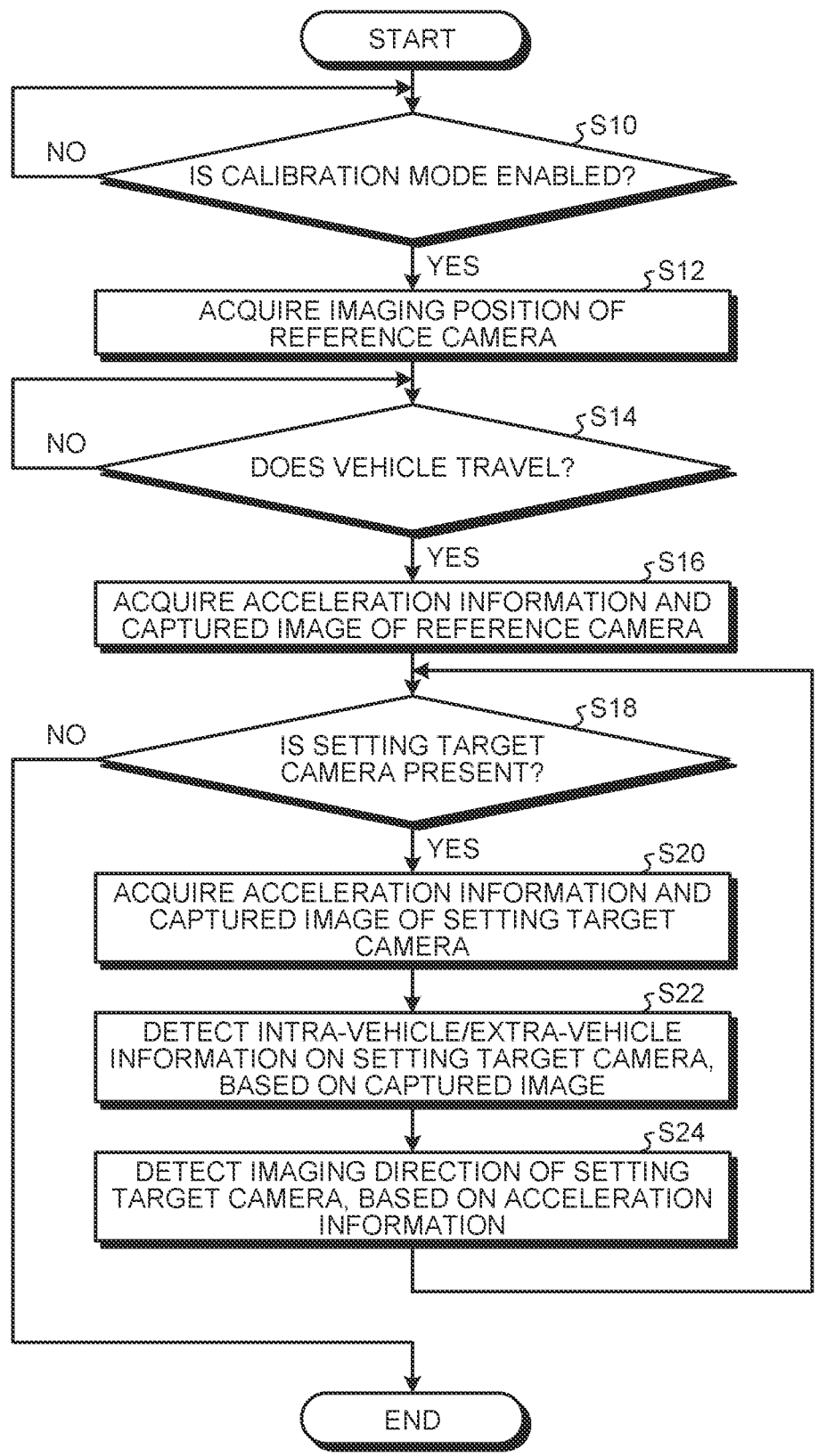
FIG. 8 is a flowchart for explaining the flow of detection of imaging positions of cameras according to the present embodiment.

The camera position detection apparatus 10 sets the imaging positions of the cameras 12 as described above. A flow of the calibration process for detecting the imaging positions of the cameras 12 by the camera position detection apparatus 10 will be described below. FIG. 8 is a flowchart for explaining the flow of detection of the imaging positions of the cameras according to the present embodiment. As illustrated in FIG. 8, if a calibration mode is enabled (Step S10; Yes), the camera position detection apparatus 10 performs the calibration process. If the calibration mode is not enabled (Step S10; No), the process returns to Step S10 and waits. The calibration mode is set by a user for example, and if the user performs input indicating that the calibration process is to be performed in the camera position detection apparatus 10, the calibration mode is enabled.

When the calibration process is to be performed, each of the cameras 12 is mounted on the vehicle V and connected to the camera position detection apparatus 10. Firstly, the camera position detection apparatus 10 acquires the information on the imaging position of the reference camera (Step S12). The camera position detection apparatus 10 identifies the camera 12 that serves as the reference imaging position on the basis of the input performed by the user for example, and extracts the identified camera 12 as the reference camera. After acquiring the information on the imaging position of the reference camera, for example, the camera position detection apparatus 10 may cause the display unit 32 to display an image for requesting a start of travel of the vehicle V in order to perform calibration. Accordingly, the user causes the vehicle V to travel. The camera position detection apparatus 10 causes the camera 12 to capture an image and detect acceleration while the vehicle V is traveling. If the vehicle V travels (Step S14; Yes), the camera position detection apparatus 10 causes the acceleration acquisition unit 52 to acquire the acceleration information on the reference camera during travel of the vehicle V, and causes the image acquisition unit 54 to acquire a captured image of the reference camera during travel of the vehicle V (Step S16). Then, the camera position detection apparatus 10 determines whether a setting target camera is present (Step S18). Specifically, the camera position detection apparatus 10 determines whether the camera 12 for which the imaging position has not been detected is present. If the setting target camera is present (Step S18; Yes), the camera position detection apparatus 10 causes the acceleration acquisition unit 52 to acquire the acceleration information on the setting target camera during travel of the vehicle V, and causes the image acquisition unit 54 to acquire a captured image of the setting target camera during travel of the vehicle V (Step S20). Then, the camera position detection apparatus 10 causes the intra-vehicle/extra-vehicle information detection unit 60 to detect the intra-vehicle/extra-vehicle information on the setting target camera (Step S22), and causes the imaging direction detection unit 62 to detect the imaging direction A of the setting target camera (Step S24), to thereby detect the imaging position of the setting target camera. After detection of the imaging position of the setting target camera is completed, the process returns to Step S18, and it is determined whether another setting target camera is still present, that is, whether the camera 12 for which the imaging position has not been detected is still present. At Step S18, if the setting target camera is not present (Step S18), that is, if detection of the imaging positions of all of the cameras 12 is completed, the process is terminated.

Figure 9:
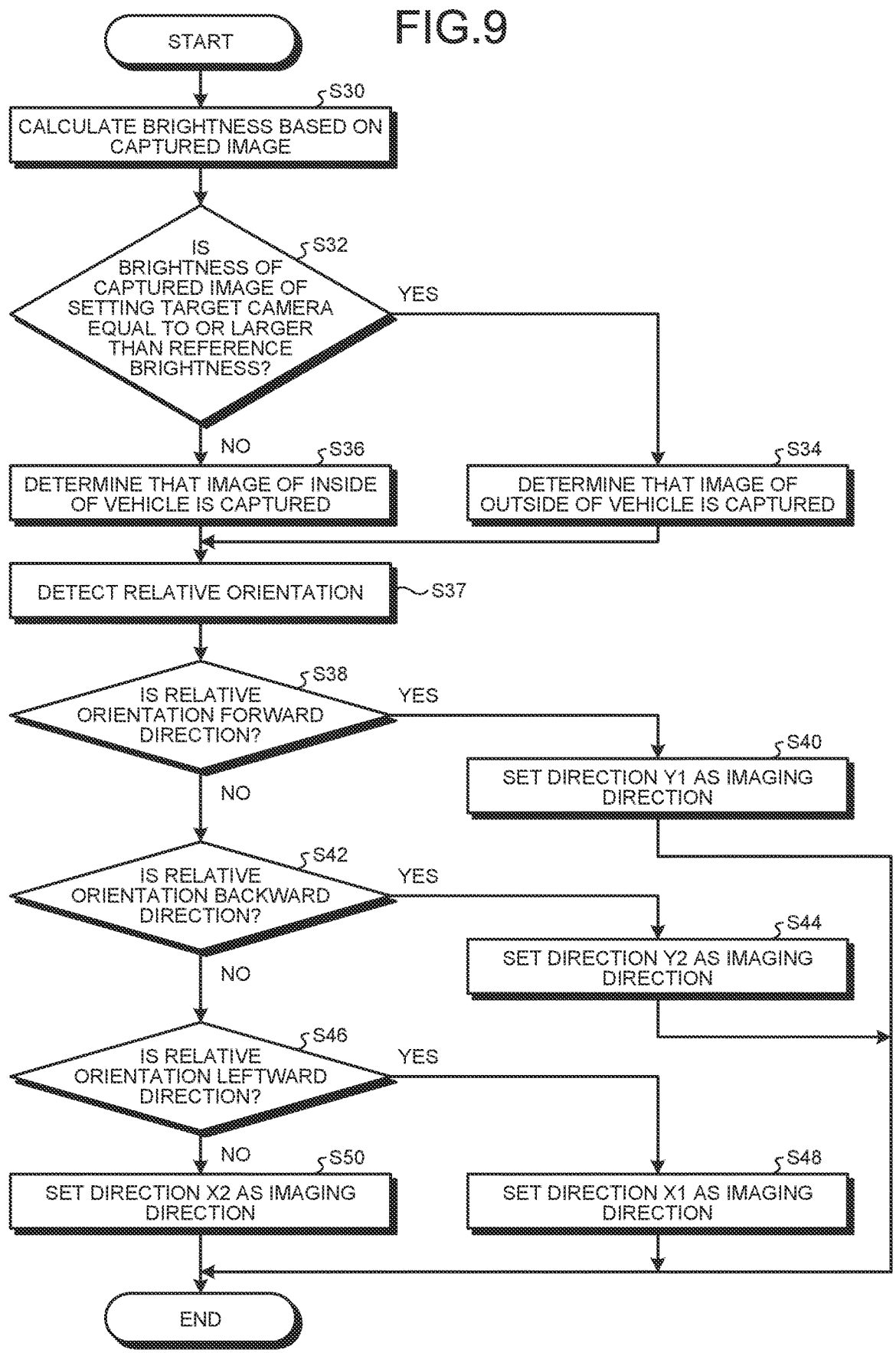
FIG. 9 is a flowchart for explaining the flow of detection of the imaging positions of the cameras according to the present embodiment.

FIG. 9 is a flowchart for explaining the flow of detection of the imaging positions of the cameras according to the present embodiment. FIG. 9 is a flowchart for explaining details of detection of the imaging positions at Steps S20 and S22 in FIG. 8. As illustrated in FIG. 9, the intra-vehicle/extra-vehicle information detection unit 60 calculates brightness of the captured image on the basis of the captured image of the camera 12 (Step S30), and determines whether the brightness of the captured image of the setting target camera is equal to or larger than the reference brightness (Step S32). If the brightness of the captured image of the setting target camera is equal to or larger than the reference brightness (Step S32; Yes), the intra-vehicle/extra-vehicle information detection unit 60 determines that the setting target camera is capturing an image of the outside of the vehicle (Step S34), and if the brightness of the captured images of the setting target cameras is not equal to or larger than the reference brightness (Step S32; No), the intra-vehicle/extra-vehicle information detection unit 60 determines that the setting target camera is capturing an image of the inside of the vehicle (Step S36). Accordingly, the intra-vehicle/extra-vehicle information on the setting target camera is detected. Then, the imaging direction detection unit 62 detects the relative orientation of the setting target camera (Step S37). The relative orientation indicates the acceleration direction D of the setting target camera viewed from the acceleration reference direction B, with respect to the acceleration direction D of the reference camera viewed from the acceleration reference direction B. If the relative orientation of the setting target camera is the forward direction (Step S38; Yes), that is, if the acceleration direction D of the setting target camera viewed from the acceleration reference direction B is the forward direction, the imaging direction detection unit 62 sets the direction Y1 as the imaging direction A of the setting target camera (Step S40). If the relative orientation of the setting target camera is not the forward direction (Step S38; No), but is the backward direction (Step S42; Yes), the imaging direction detection unit 62 sets the direction Y2 as the imaging direction A of the setting target camera (Step S44). If the relative orientation of the setting target camera is not the backward direction (Step S42; No), but the leftward direction (Step S46), the imaging direction detection unit 62 sets the direction X1 as the imaging direction A of the setting target camera (Step S48). If the relative orientation of the setting target camera is not the leftward direction (Step S46; No), the imaging direction detection unit 62 sets the direction X2 as the imaging direction A of the setting target camera (Step S50).

As described above, the camera position detection apparatus 10 according to the present embodiment detects the imaging positions indicating positions at which the plurality of cameras 12 that are mounted on the vehicle V and that include the acceleration sensors 22 capture images with respect to the vehicle V. The camera position detection apparatus 10 includes the reference camera information acquisition unit 50, the acceleration acquisition unit 52, and the imaging position detection unit 56. The reference camera information acquisition unit 50 acquires the information on the imaging position of the reference camera that is one of the cameras 12. The acceleration acquisition unit 52 acquires the information on the acceleration detected by the acceleration sensor 22 for each of the cameras 12. The imaging position detection unit 56 detects the imaging position of the setting target camera on the basis of the information on the imaging position of the reference camera, the information on the acceleration of the reference camera, and the information on the acceleration of the setting target camera.

When images captured by the cameras 12 are displayed or transmitted, it is necessary to identify the imaging position of each of the cameras 12. The camera position detection apparatus 10 according to the present embodiment detects the imaging positions of the cameras 12 on the basis of the imaging position of the reference camera and the information on the acceleration of each of the cameras, so that it is possible to appropriately set the imaging positions of the cameras 12. Furthermore, if the plurality of cameras 12 are present, for example, it takes time and effort for a user to identify and set the imaging position of each of the cameras 12. In contrast, according to the camera position detection apparatus 10 of the present embodiment, for example, it is possible to detect the imaging positions of all of the cameras 12 by requesting a user to input the imaging position of the reference camera and causing the vehicle V to travel. Therefore, even when the plurality of cameras 12 are provided, it is possible to easily set the imaging position of each of the cameras 12.

Furthermore, the reference camera information acquisition unit 50 acquires the information on the imaging direction A of the reference camera as the imaging position. The acceleration acquisition unit 52 acquires the information on the acceleration direction D as the information on the acceleration. The imaging position detection unit 56 causes the imaging direction detection unit 62 to detect the relative orientation of the setting target camera on the basis of the acceleration direction D of the reference camera and the acceleration direction of the setting target camera. The relative orientation is the orientation of the acceleration direction D of the setting target camera with respect to the acceleration direction D of the reference camera. Moreover, the imaging position detection unit 56 detects, as the imaging position, the imaging direction of the setting target camera on the basis of the imaging direction A of the reference camera and the relative orientation of the setting target camera. The camera position detection apparatus 10 according to the present embodiment detects the relative orientation that is the orientation of the acceleration direction D of the setting target camera with respect to the acceleration direction D of the reference camera, to thereby detect the orientation of the imaging direction of the setting target camera with respect to the imaging direction of the reference camera. With this configuration, the camera position detection apparatus 10 is able to appropriately and easily set the imaging directions of the cameras 12.

Furthermore, the imaging position detection unit 56 detects, as the imaging position of the setting target camera, the intra-vehicle/extra-vehicle information indicating whether the setting target camera captures an image of the inside of the vehicle or an image of the outside of the vehicle. If the camera 12 that captures the inside of the vehicle and the camera 12 that captures the outside of the vehicle are provided, it may be difficult to appropriately detect the imaging positions by detecting only the imaging directions. In contrast, the camera position detection apparatus 10 according to the present embodiment detects whether the image of the inside of the vehicle or the image of the outside of the vehicle is captured, so that it is possible to appropriately set the imaging positions of the cameras 12.

Moreover, the camera position detection apparatus 10 further includes the image acquisition unit 54 that acquires the captured images of the cameras 12. The imaging position detection unit 56 detects the intra-vehicle/extra-vehicle information on the setting target camera on the basis of the captured images of the cameras 12. The camera position detection apparatus 10 according to the present embodiment detects the intra-vehicle/extra-vehicle information on the basis of the captured images of the cameras 12, so that it is possible to appropriately detect whether the image of the inside of the vehicle or the image of the outside of the vehicle is captured.

Furthermore, the imaging position detection unit 56 detects the intra-vehicle/extra-vehicle information on the setting target camera on the basis of the brightness of the captured image of the reference camera and the brightness of the captured image of the setting target camera. The camera position detection apparatus 10 according to the present embodiment detects the intra-vehicle/extra-vehicle information on the basis of the brightness of the captured images of the cameras 12, so that it is possible to appropriately detect whether the image of the inside of the vehicle or the image of the outside of the vehicle is captured.

Moreover, the imaging position detection unit 56 detects whether an optical image reflected by the glass of the vehicle V appears in the captured image of the setting target camera, and detects the intra-vehicle/extra-vehicle information on the setting target camera on the basis of a detection result. The cameras 12 may capture reflected light in some cases. The intra-vehicle/extra-vehicle information is detected on the basis of the reflected light, so that it is possible to appropriately detect whether the image of the inside of the vehicle or the image of the outside of the vehicle is captured.

Furthermore, the camera unit 1 according to the present embodiment includes the camera position detection apparatus 10 and the plurality of cameras 12. With the camera position detection apparatus 10, the camera unit 1 is able to easily and appropriately set the imaging position of each of the cameras 12.

Figure 10:
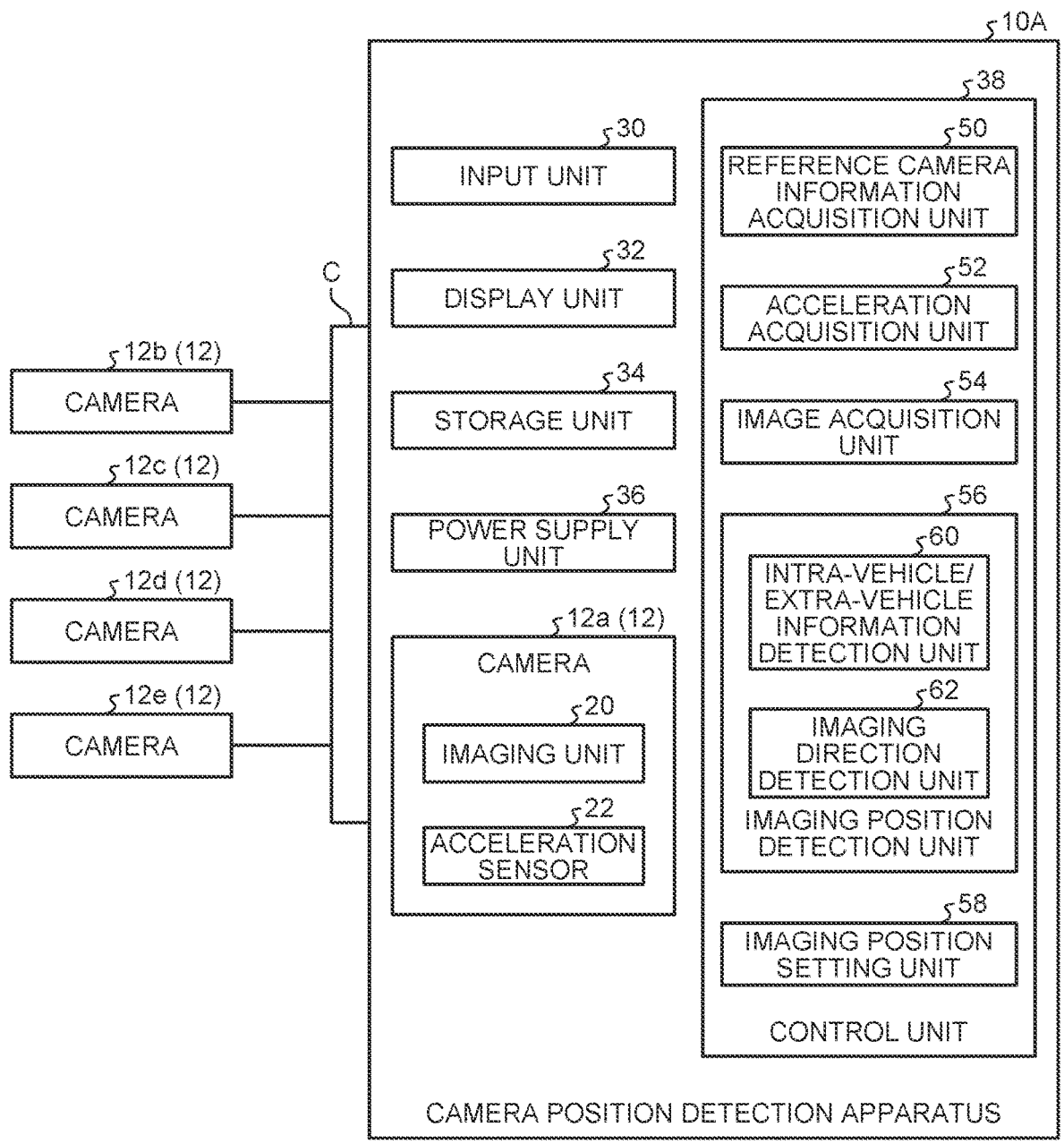
FIG. 10 is a schematic block diagram of a camera unit according to another example of the present embodiment.

Meanwhile, the camera position detection apparatus 10 and the cameras 12 are described as separate bodies in the above-described example; however, as illustrated in FIG. 10, a camera position detection apparatus 10A may include the single camera 12. FIG. 10 is a schematic block diagram of a camera unit according to another example of the present embodiment. As illustrated in FIG. 10, a camera position detection apparatus 10A may include a camera 12a. Even in this case, it is preferable that the other cameras 12 are separated from the camera position detection apparatus 10A. In this manner, by providing the single camera 12a in the camera position detection apparatus 10A, it is possible to set the camera 12a as the reference camera even without causing the user to perform input, for example.

While some examples of the present embodiments have been described, the embodiments are not limited by details of the examples as described above. Further, the structural elements described above include one that can easily be thought of by a person skilled in the art, one that is practically identical, and one that is within an equivalent range. Furthermore, the structural elements described above may be combined appropriately, and configurations of the embodiments may be combined. Moreover, various omission, replacement, and modifications of the structural elements may be made within the scope not departing from the gist of the embodiments as described above.

INDUSTRIAL APPLICABILITY

A camera position detection apparatus, a camera unit, a camera position detection method, and a program according to the present embodiment may be applied to a camera unit for a vehicle, for example.

What is claimed is:

1. A camera unit, comprising:
a plurality of cameras that are mounted on a vehicle and that include acceleration sensors,
a camera position detection apparatus that detects imaging positions indicating positions at which the cameras capture images with respect to the vehicle, wherein the camera position detection apparatus includes a reference camera information acquisition unit that acquires information on the imaging position of a reference camera that is a part of the cameras;
an acceleration acquisition unit that acquires information on acceleration detected by the acceleration sensor for each of the cameras; and
an imaging position detection unit that detects an imaging position of each of setting target cameras that is different from the reference camera among the cameras, on the basis of the information on the imaging position of the reference camera, the information on the acceleration of the reference camera, and the information on the acceleration of each of setting target cameras.

2. The camera unit according to claim 1, wherein
the reference camera information acquisition unit acquires, as the imaging position, information on an imaging direction of the reference camera,
the acceleration acquisition unit acquires, as the information on the acceleration, information on an acceleration direction, and
the imaging position detection unit
detects a relative orientation that is an orientation of an acceleration direction of each of the setting target cameras with respect to an acceleration direction of the reference camera, on the basis of the acceleration direction of the reference camera and the acceleration direction of each of the setting target cameras, and
detects, as the imaging position, an imaging direction of each of the setting target cameras on the basis of the imaging direction of the reference camera and the relative orientation.

3. The camera unit according to claim 1, wherein the imaging position detection unit detects, as the imaging position of each of the setting target cameras, intra-vehicle/extra-vehicle information indicating whether the setting target cameras capture an image of inside of the vehicle or an image of outside of the vehicle.

4. The camera unit according to claim 3, further comprising:
an image acquisition unit that acquires captured images of the cameras, wherein
the imaging position detection unit detects the intra-vehicle/extra-vehicle information on each of the setting target cameras on the basis of the captured images of the cameras.

5. The camera unit according to claim 4, wherein the imaging position detection unit detects the intra-vehicle/extra-vehicle information on each of the setting target cameras on the basis of brightness of the captured image of the reference camera and brightness of the captured image of each of the setting target cameras.

6. The camera unit according to claim 4, wherein the imaging position detection unit detects whether an optical image reflected by a glass of the vehicle appears in the captured image of each of the setting target cameras, and detects the intra-vehicle/extra-vehicle information on each of the setting target cameras on the basis of a detection result.

7. A camera position detection method for detecting imaging positions of a plurality of cameras that are mounted on a vehicle and that include acceleration sensors, the imaging positions indicating positions at which the cameras capture images with respect to the vehicle, the camera position detection method comprising:
a reference imaging position acquisition step of acquiring information on the imaging position of a reference camera that is a part of the cameras;
an acceleration acquisition step of acquiring information on acceleration detected by the acceleration sensor for each of the cameras; and
an imaging position detection step of detecting an imaging position of each of setting target cameras that is different from the reference camera among the cameras, on the basis of the information on the imaging position of the reference camera, the information on the acceleration of the reference camera, and the information on acceleration of each of the setting target cameras.

8. A non-transitory computer readable recording medium storing therein a program that causes a computer to detect imaging positions of a plurality of cameras that are mounted on a vehicle and that include acceleration sensors, the imaging positions indicating positions at which the cameras capture images with respect to the vehicle, the program causing the computer to execute:
a reference imaging position acquisition step of acquiring information on the imaging position of a reference camera that is a part of the cameras;
an acceleration acquisition step of acquiring information on acceleration detected by the acceleration sensor for each of the cameras; and
an imaging position detection step of detecting an imaging position of each of setting target cameras that is different from the reference camera among the cameras, on the basis of the information on the imaging position of the reference camera, the information on the acceleration of the reference camera, and the information on acceleration of each of the setting target cameras.

* * * * *